Dec. 2, 1941.                J. W. BRYCE                2,264,615
                KEYBOARD CONTROLLED PHOTOGRAPHIC RECORDER
                  Filed Nov. 1, 1939          14 Sheets-Sheet 1
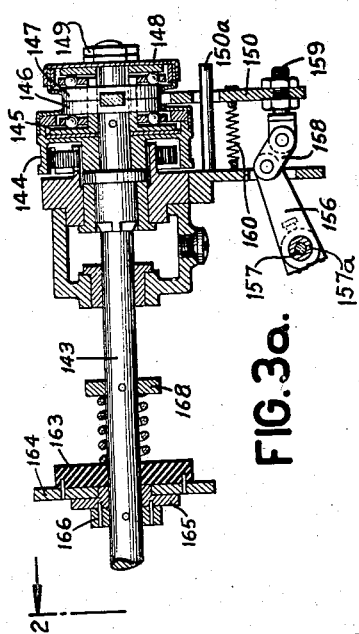
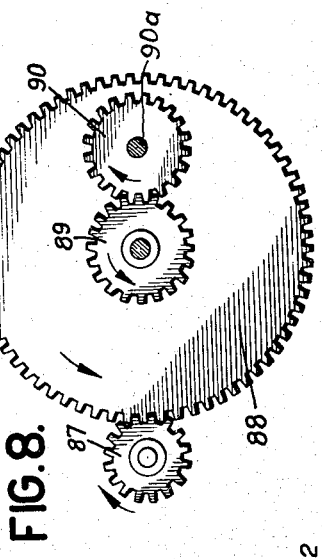
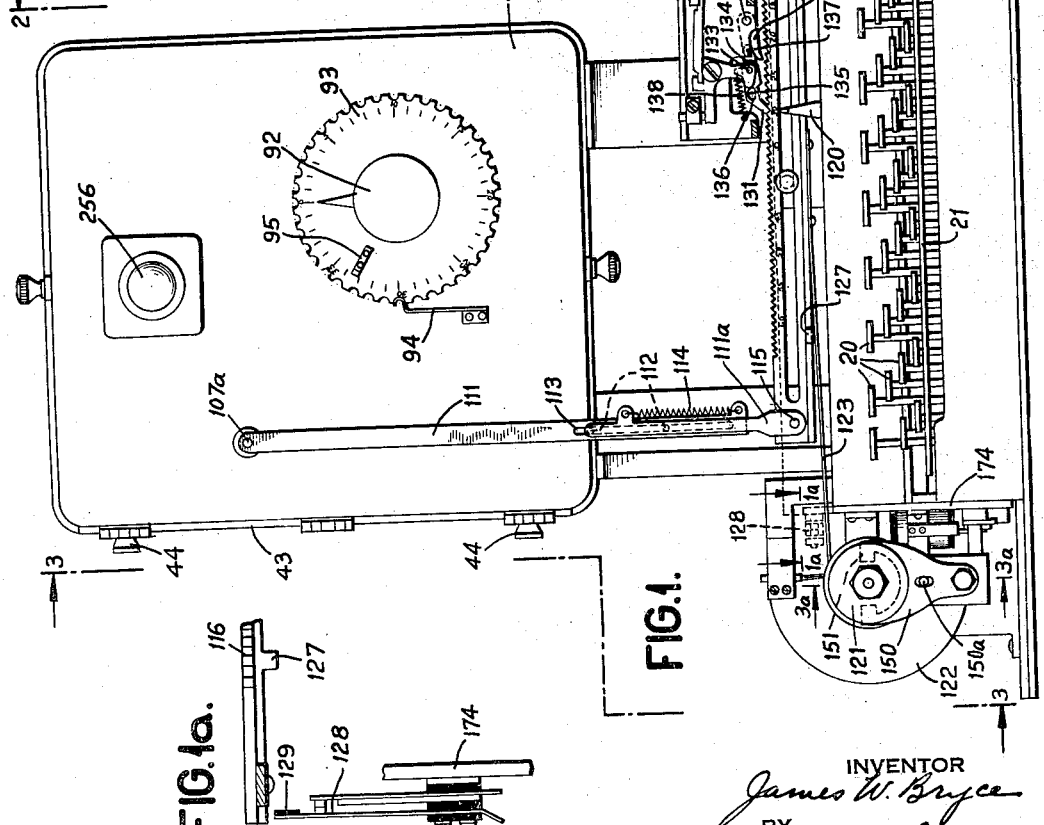
INVENTOR
James W. Bryce
BY
Cooper, Kerr & Dunham
ATTORNEYS

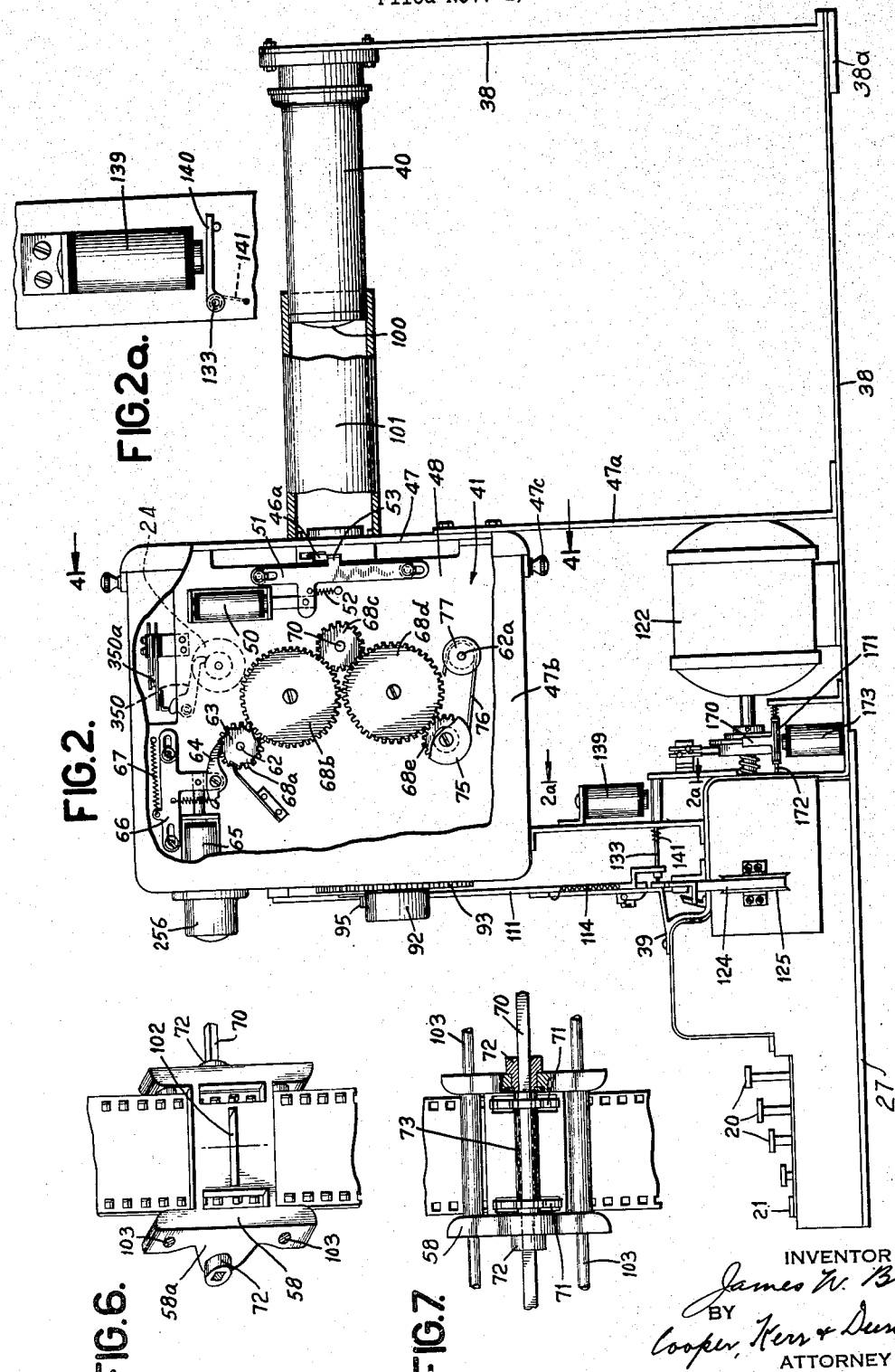

Dec. 2, 1941.          J. W. BRYCE                 2,264,615
         KEYBOARD CONTROLLED PHOTOGRAPHIC RECORDER
                 Filed Nov. 1, 1939        14 Sheets-Sheet 4

INVENTOR
James W. Bryce
BY
Cooper, Kerr & Dunham
ATTORNEYS

Dec. 2, 1941.  J. W. BRYCE  2,264,615
KEYBOARD CONTROLLED PHOTOGRAPHIC RECORDER
Filed Nov. 1, 1939  14 Sheets-Sheet 5
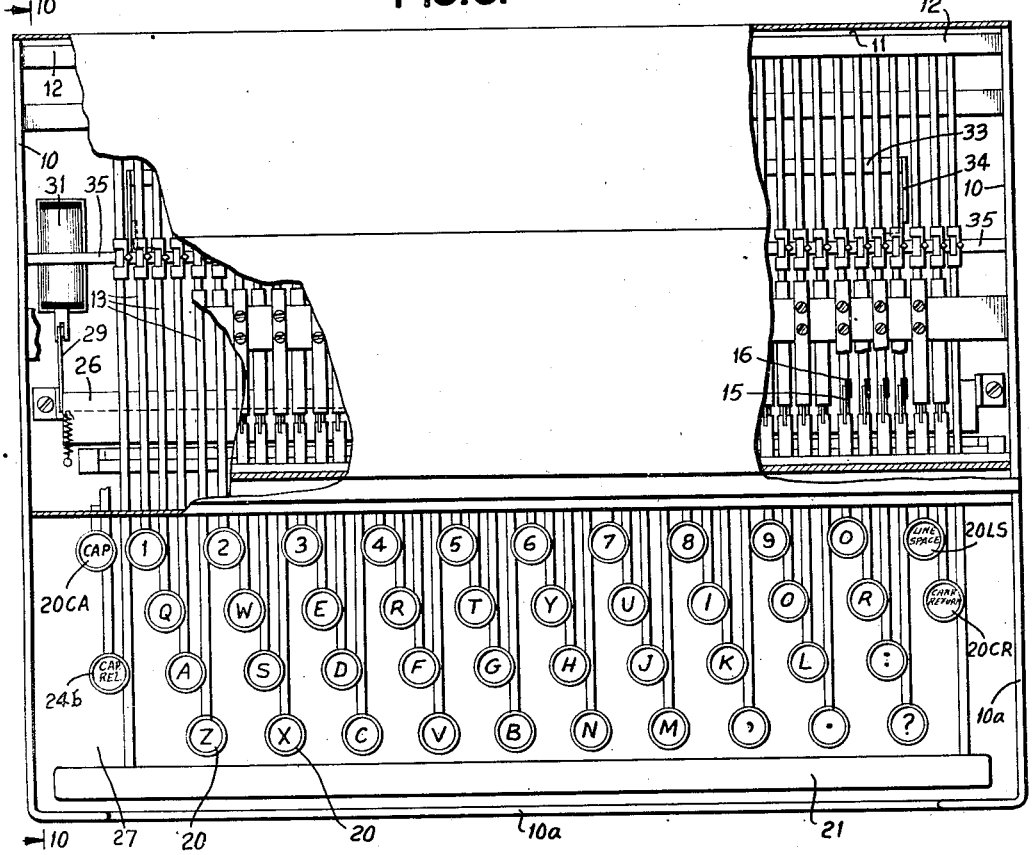
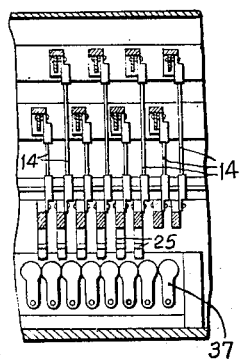
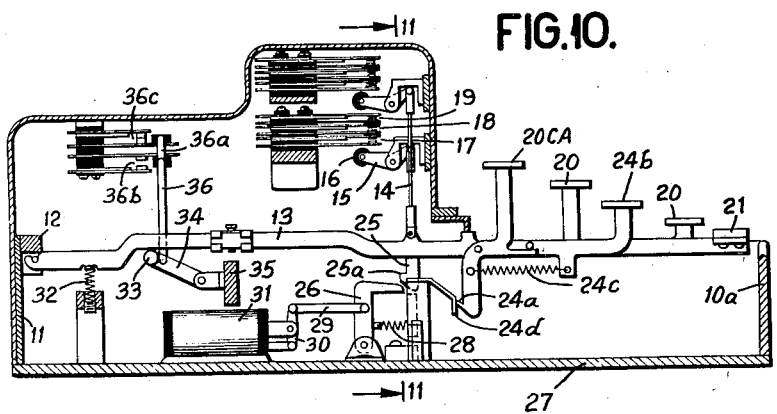
INVENTOR
James W. Bryce
BY
Cooper, Kerr & Dunham
ATTORNEYS Dec. 2, 1941. J. W. BRYCE 2,264,615
KEYBOARD CONTROLLED PHOTOGRAPHIC RECORDER
Filed Nov. 1, 1939 14 Sheets-Sheet 6
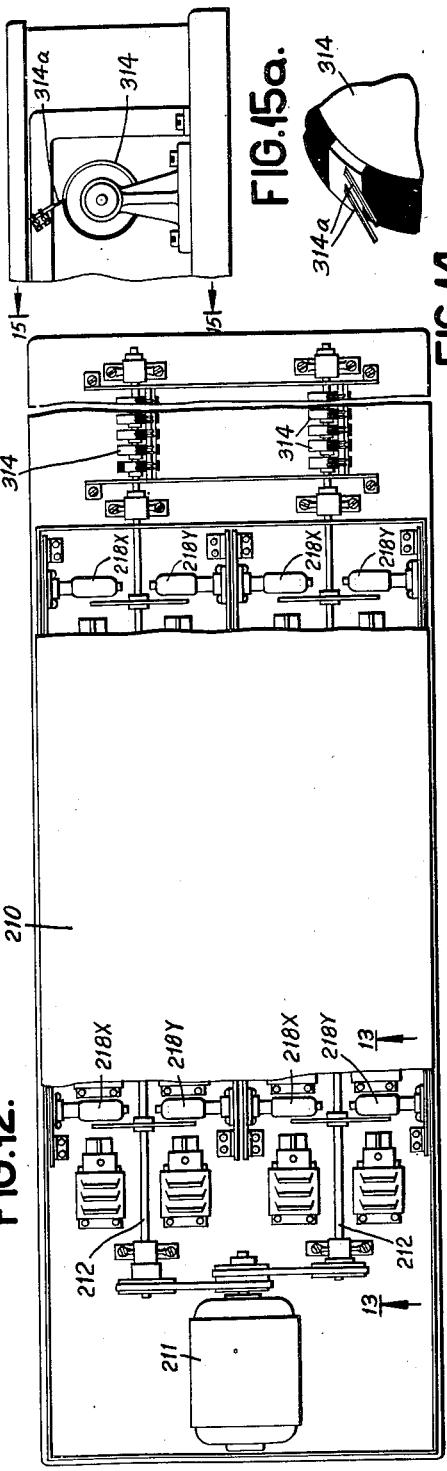
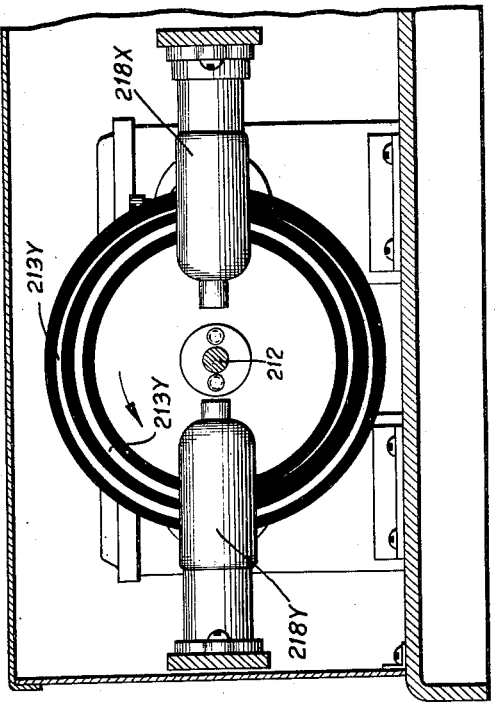
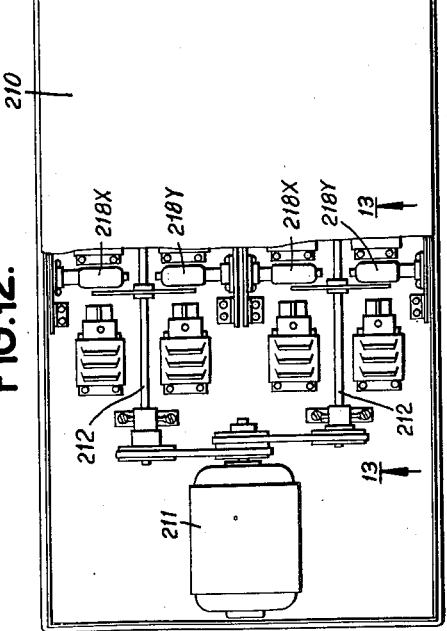
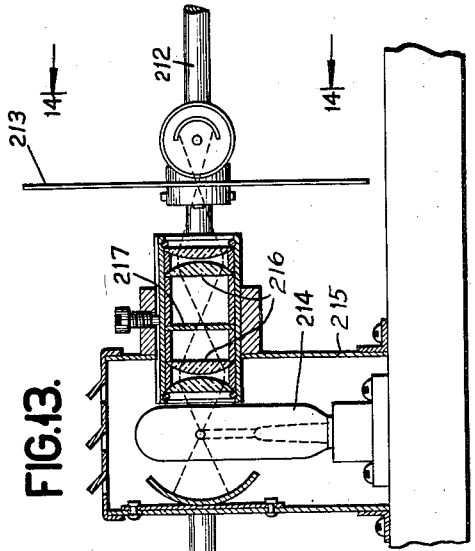
INVENTOR
James W. Bryce
BY
Cooper, Kerr & Dunham
ATTORNEYS Dec. 2, 1941.    J. W. BRYCE    2,264,615
KEYBOARD CONTROLLED PHOTOGRAPHIC RECORDER
Filed Nov. 1, 1939    14 Sheets-Sheet 7

INVENTOR
James W. Bryce
BY
Cooper, Kerr + Dunham
ATTORNEYS

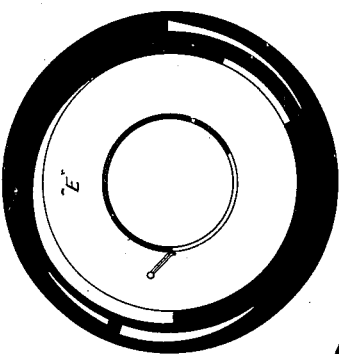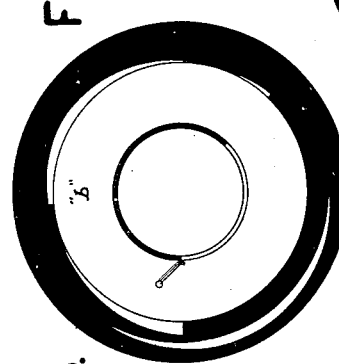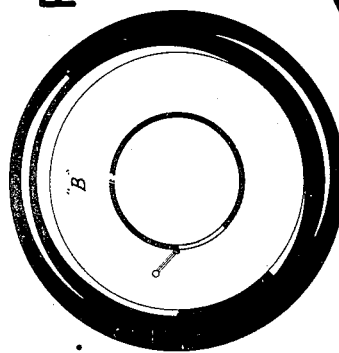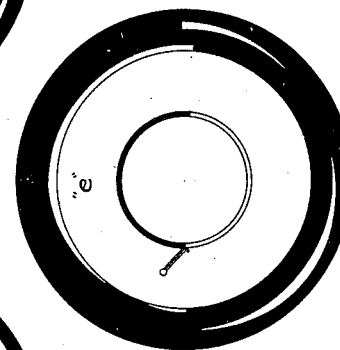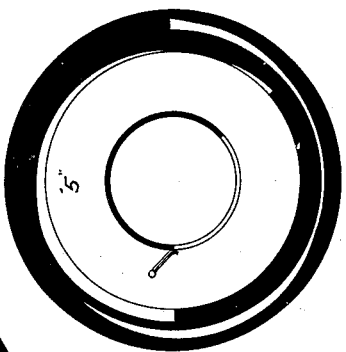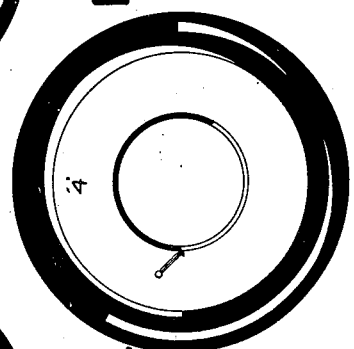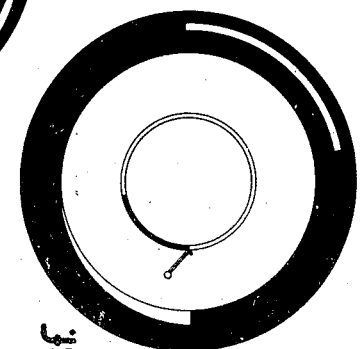

Dec. 2, 1941. J. W. BRYCE 2,264,615
KEYBOARD CONTROLLED PHOTOGRAPHIC RECORDER
Filed Nov. 1, 1939 14 Sheets-Sheet 9

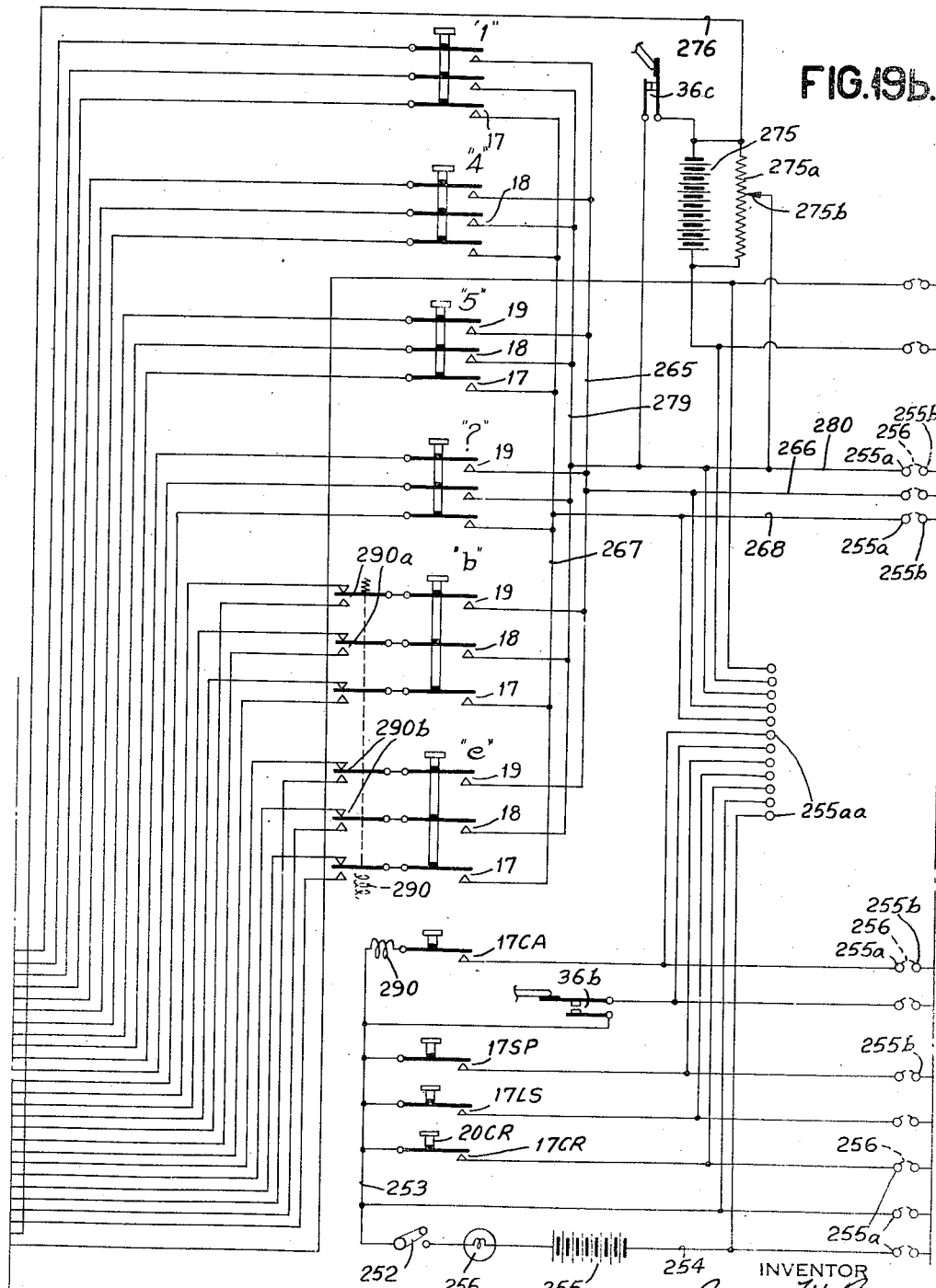

Dec. 2, 1941.   J. W. BRYCE   2,264,615
KEYBOARD CONTROLLED PHOTOGRAPHIC RECORDER
Filed Nov. 1, 1939    14 Sheets-Sheet 11

INVENTOR
James W. Bryce
BY
Cooper, Kerr & Dunham
ATTORNEYS

Dec. 2, 1941.   J. W. BRYCE   2,264,615
KEYBOARD CONTROLLED PHOTOGRAPHIC RECORDER
Filed Nov. 1, 1939   14 Sheets-Sheet 12

INVENTOR
James W. Bryce
BY
Cooper, Kerr & Dunham
ATTORNEYS

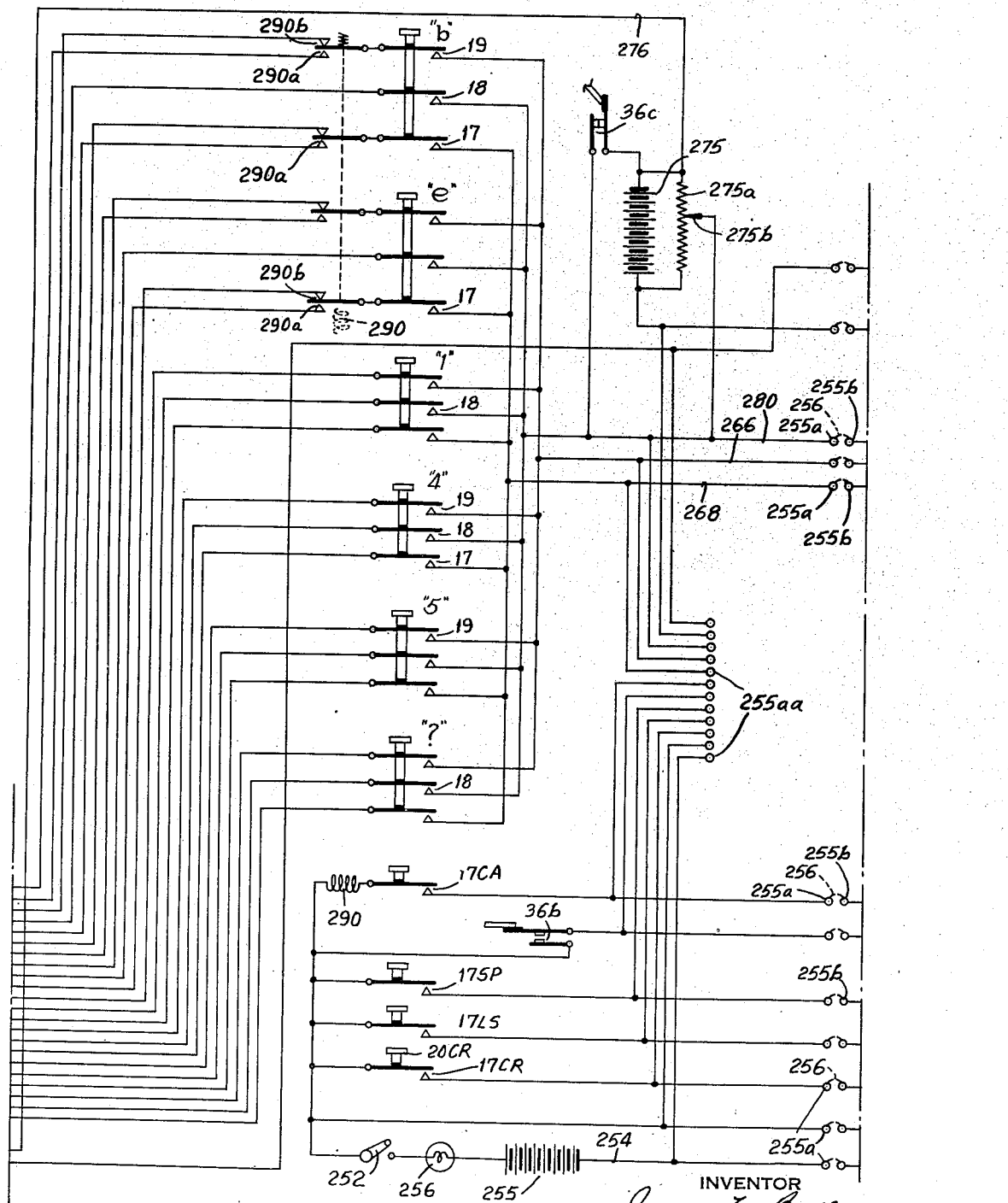

Dec. 2, 1941.  J. W. BRYCE  2,264,615
KEYBOARD CONTROLLED PHOTOGRAPHIC RECORDER
Filed Nov. 1, 1939    14 Sheets—Sheet 14
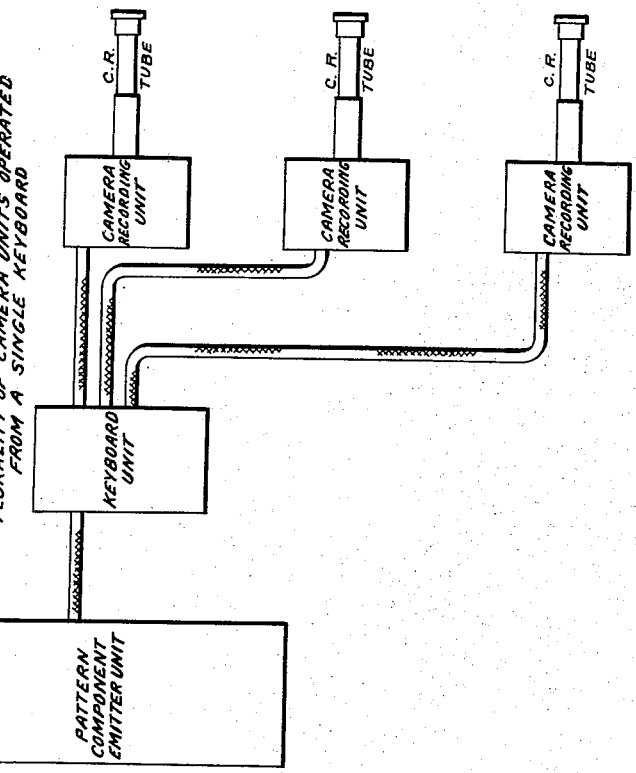
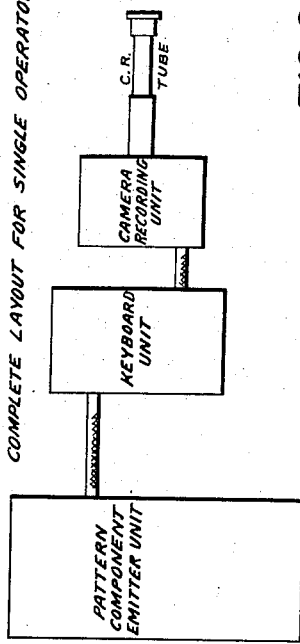
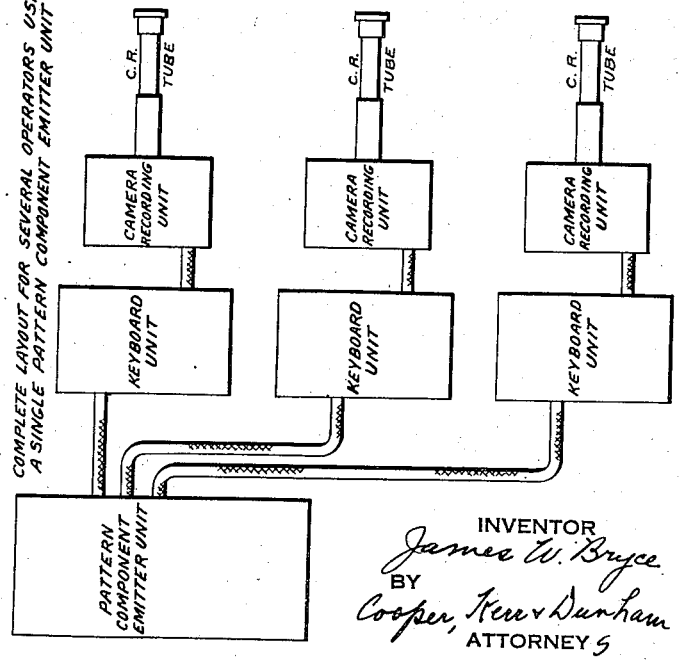
INVENTOR
James W. Bryce
BY
Cooper, Kerr & Dunham
ATTORNEYS Patented Dec. 2, 1941

2,264,615

UNITED STATES PATENT OFFICE 2,264,615

KEYBOARD CONTROLLED PHOTOGRAPHIC RECORDER

James W. Bryce, Glen Ridge, N. J., assignor to International Business Machines Corporation, New York, N. Y., a corporation of New York Application November 1, 1939, Serial No. 302,356

10 Claims. (Cl. 178—23)

This invention relates to a keyboard controlled recording machine intended for use in lieu of a typewriter.

This invention has for its general object the provision of a recording machine adapted for both speedy and noiseless operation.

A further object resides in the provision of a machine adapted to provide an extremely compact record in film form, such film record may be readily reproduced in original or enlarged size.

A further object of the present invention resides in the provision of a novel recording system and set of units to enable one set of pattern component emitters to be used with a plurality of camera recording units. Furthermore, a single keyboard may be used for controlling a plurality of camera recording units or an individual keyboard may be provided for each camera recording unit. The camera recording may be remote from the controlling keyboards and also remote from the pattern component emitters.

A further object of the present invention resides in the provision of novel means for enabling recording of upper or lower case.

Otherwise stated novel means are provided to enable a character to be recorded in varying sizes, i. e., large or small.

A further object of the present invention resides in the provision of a recording apparatus adapted for keyboard control wherein the keyboard action is such that the minimum of exertion is required of an operator.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figure 1 is a front view of a combined keyboard and recording means with a portion of the keyboard unit omitted as indicated by the dotted outline;

Fig. 1a is a detail view taken on the line 1a—1a of Fig. 1 but with the parts in shifted relation;

Fig. 2 is a right end elevational view of a combined keyboard and camera recording unit taken on line 2—2 of Fig. 1 and including the portion which is omitted in Fig. 1. Certain cover parts are shown broken away in the figure.

Fig. 2a is a detail sectional view taken on the line 2a—2a of Fig. 2;

Fig. 3a is a sectional view taken on line 3a—3a of Fig. 1 showing details of the carriage return clutch and commutator clutch mechanism;

Fig. 6 is a detail isometric view of the film gate;

Fig. 7 is a detail view of the gate taken on line 7—7 of Fig. 5;

Fig. 8 is a detail sectional view of the index mechanism drive and is taken on line 8—8 of Fig. 5;

Fig. 9 is a plan view of the keyboard unit with certain portions cut away to show details of construction;

Fig. 10 is a side elevational view taken on line 10—10 of Fig. 9 showing details of the keyboard unit;

Fig. 11 is a detail sectional view taken on line 11—11 of Fig. 10 and shows details of the key interlocks and contact controlling mechanism;

Fig. 12 is a top plan view of a pattern component emitter unit and commutator unit with the parts of the cover broken away to show the construction;

Fig. 13 is a detail sectional view of one of the pattern component emitters, the section being taken on line 13—13 of Fig. 12;

Fig. 14 is an end elevational view taken substantially on line 14—14 of Fig. 13;

Fig. 15 is a partial side elevational view of the pattern component emitter and commutator unit of Fig. 12 taken on line 15—15 of Fig. 12;

Fig. 15a is a detail view of a fragment of one of the commutators showing a pair of brushes cooperating therewith;

Figure 19A:
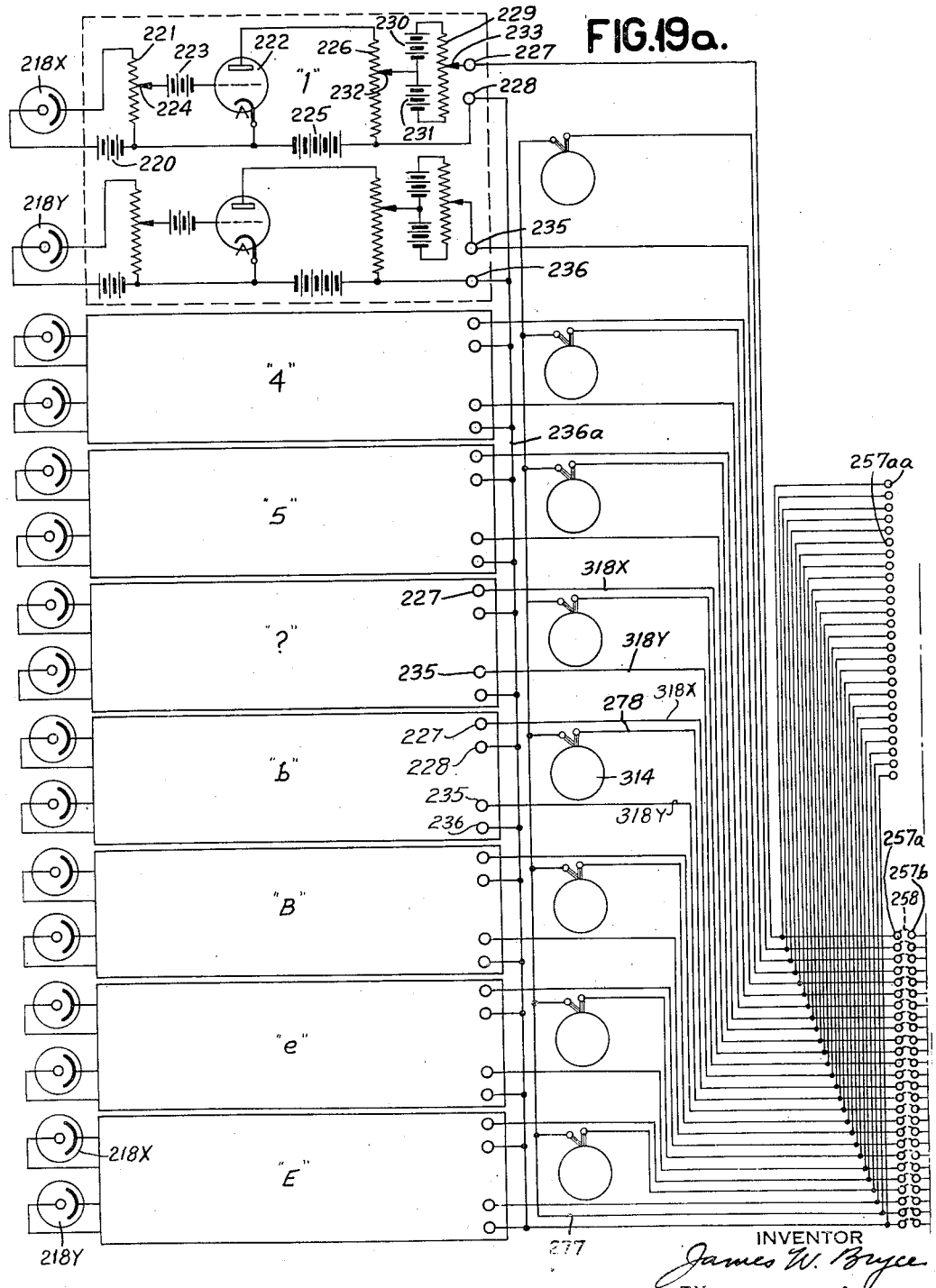
Figure 19D:
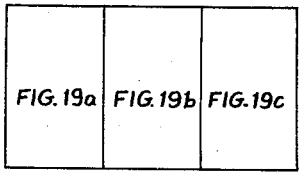
Figure 19C:
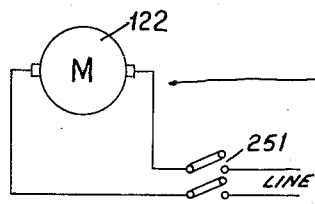
Figure 20A:
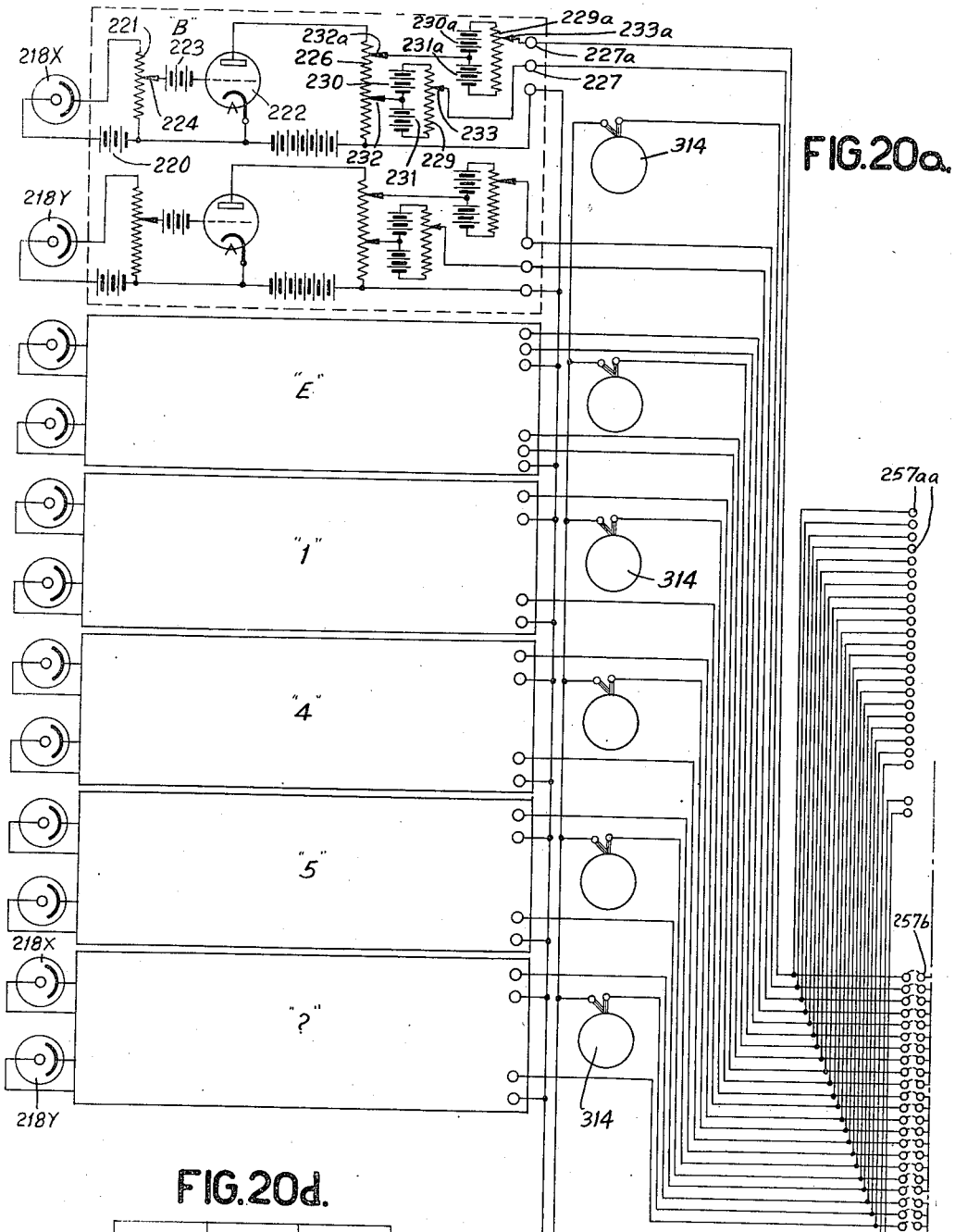
Figure 20D:
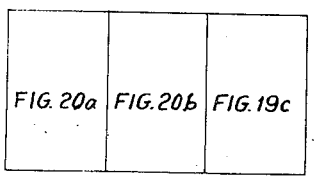

Figs. 18a to 18h, inclusive, are layouts for certain other characters;

Figs. 19a, 19b and 19c taken together and arranged as shown in Fig. 19d show the circuit diagram of a complete recording apparatus;

Fig. 19d is a schematical layout of the circuit diagram in Figs. 19a to 19c;

Figs. 20a, 20b and 19c taken together and arranged as shown in Fig. 20d show a circuit diagram of a modified embodiment of the invention;

Fig. 20d is a schematic layout of the circuit diagram which includes Figs. 20a, 20b and 19c;

Fig. 21 is a schematic layout of a complete recording apparatus embodying a pattern component emitter unit, a single keyboard unit and a single camera recording unit;

Fig. 22 is a schematic layout of a system including a pattern component emitter unit, a plurality of keyboard units with a camera recording unit for each keyboard; and Fig. 23 is a schematic layout of a system wherein one keyboard unit controls recording by a plurality of camera recording units.

*General*

Before describing the apparatus in detail, it may be stated that the apparatus comprises three main groups of units or sections, viz. a pattern component emitter section or unit, a keyboard section or unit and a camera recording section or unit. Each camera recording unit includes a reel of photographic film which is escaped laterally step by step and adapted for advance in the direction of its length line by line under the control of an escapement and film feeding mechanism. A cathode ray tube is provided on which characters are displayed one by one in succession. As each character is displayed, the usual shutter and lens exposes a portion of the film and photographs the displayed character. Which character is displayed by the cathode ray tube depends upon which key of the keyboard is depressed. The keyboard comprises another unit or section of the machine and each keyboard is intermediate the cathode ray tube of the camera recording unit and a source of character configuration determining devices which are termed pattern component emitters. One of such emitters is provided for each different character and the keys of the keyboard control switches which are adapted to connect the pattern component emitter related to the depressed key to the cathode ray tube.

By the use of the foregoing instrumentalities a typewriter substitute is provided which has desirable characteristics not heretofore obtained with usual typewriter constructions. The key action is simple and it is extremely light in action. Standard order and arrangement of keys is retained. The recording action is substantially noiseless without sacrifice of speed. The photograph record is extremely compact but it may readily be enlarged and any number of duplicate copies obtained either as enlargements or in their original size.

The components and devices utilized further lend themselves to remote control of one unit from another unit. For example, the keyboard does not have to be in juxtaposition to the recording unit or the emitter. Nor do these last two units have to be in juxtaposition.

It is further possible to so relate the units that one keyboard may control a plurality of recording units when duplicates are desired to be made concurrently. Also a character component emitter unit or section may be common to a plurality of keyboards and recording units. This simplifies the construction and reduces the cost in large installations. Provision is also made for recording characters selectively in upper or lower case and characters may also be recorded with a common outline, but in smaller or larger size. The basic principles of the system lend themselves to character changes by only changing the pattern component emitter section and the key caps. Characters of special form such as for chemical mathematical and foreign languages may be readily obtained or added as desired.

*Keyboard unit*

The general structure of a keyboard unit is disclosed in Figs. 9, 10 and 11. The keyboard unit as shown in Fig. 9 comprises side frames 10 which are integral with a front piece 10a. Mounted between the side frames 10 is a back plate 11 (see Figs. 9 and 10). Suitably fastened to the back plate 11 is a key supporting member 12. Pivoted to the member 12 are a plurality of key levers 13. Each key lever 13 is provided with a suitably lettered key cap 20. Each key lever 13 has connected to it a pull rod 14 fastened to a bell crank 15 provided with an insulated roller 16. The depression of any key is adapted to close a related set of contacts 17, 18 and 19, which are disposed directly above the insulated roller 16. Each contact combination 17, 18, 19 is made up of two individual contact blades. Accordingly, upon the depression of any key corresponding pairs of contacts will close and each contact pair will complete an individual circuit. The keys 13, with a few exceptions are provided with notched extensions 25 (see Fig. 10). The exceptions are the two key levers which extend to space bar 21, the carriage return key provided with cap 20CR, the line space key with cap 20LS, and capital key 20CA. Disposed beneath the notched extensions 25 is a locking bar 26 (see Fig. 10) which extends under all the key levers as shown in Fig. 9. The locking bar is suitably pivoted to the base 27 and is spring urged to the right by a spring 28 (Fig. 10). Depression of any key carrying an extension portion 25 will rock locking bar 26 anti-clockwise until the notch 25a is under the upper portion of locking bar 26. Locking bar 26 will then return under the action of spring 28 in a clockwise direction and lock the key in a down position. Bar 26 is connected by means of a link 29 and rocker arm 30 to a solenoid 31. Upon energization of solenoid 31, the bar 26 is rocked anti-clockwise and the key is released to move upwardly under action of compression spring 32. Disposed beneath certain of the keys 13 is a bail 33 fastened to two end frames 34 as shown in Figs. 9 and 10. These end frames are suitably pivoted to a cross member 35.

Depression of any key under which the bar 33 extends will pull down the links 36 and 36a to close bail contact 36b and open bail contact 36a. To prevent depression of more than one key at a time, the extensions 24 are interposed between banjo locks 37 (Fig. 11). These locks are so placed that with any key depressed, all available space between them is utilized whereby concurrent depression of two keys is prevented. The space bar 21 which is fastened to the extreme right-hand key lever as viewed in Fig. 9 and the second key lever from the left in the same figure is adapted to close only a single set of contacts such as contacts 17 in Fig. 10. The function of these contacts will be further explained in the description of the circuit diagram. Similarly the capital key 20CA, line space key 20LS and carriage return key 20CR are adapted to close but a single set of contacts. Further reference will be made to these contacts in connection with the description of the circuit diagram.

Recording unit

In general the recording unit comprises a camera assembly 41, an escapement mechanism generally designated 42, a motor 122 with a drive for restoring the escapement, and a cathode ray tube 40. These parts are mounted in the manner shown in Figs. 1, 2 and 3 on a frame 38. This frame is shaped so as to be adapted to rest upon the back portion of the keyboard unit and may be fastened thereto by screws 39. If desired the recording unit may be located remote from the keyboard unit and connected thereto merely by wires. In such case the screws 39 are removed to permit disconnection of the two units. Blocks 38a provide for alignment between the frame 38 of the keyboard and the base 27 of the recording unit. The character to be recorded is depicted by the cathode ray tube 40. This character is then photographed on film by means of the camera unit 41. The escapement mechanism in a manner to be described later, provides for spacing the film from one character space to the next after recording each character.

Figure 4:
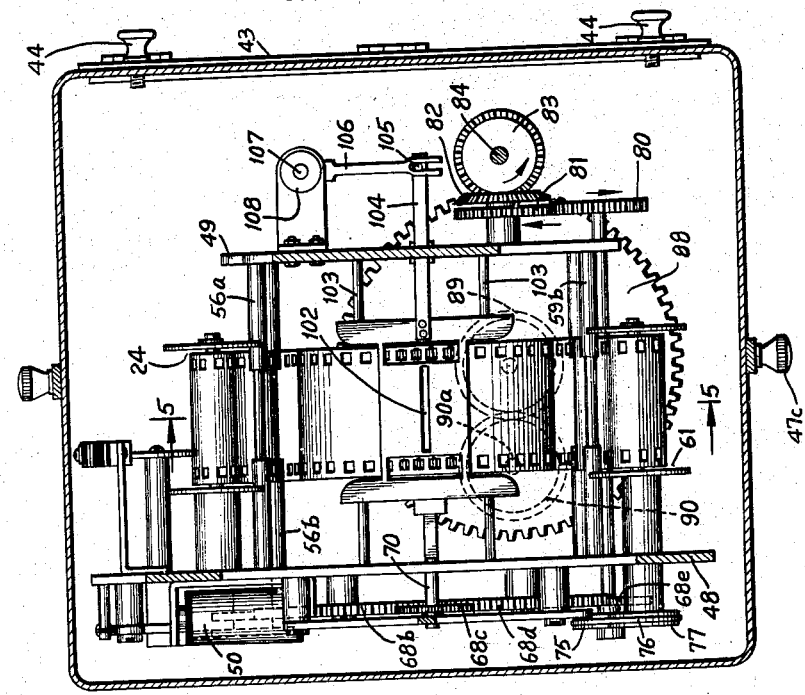
Fig. 4 is a section view taken approximately on line 4—4 of Fig. 2 and shows details of the camera parts in the recording unit.
Figure 5:
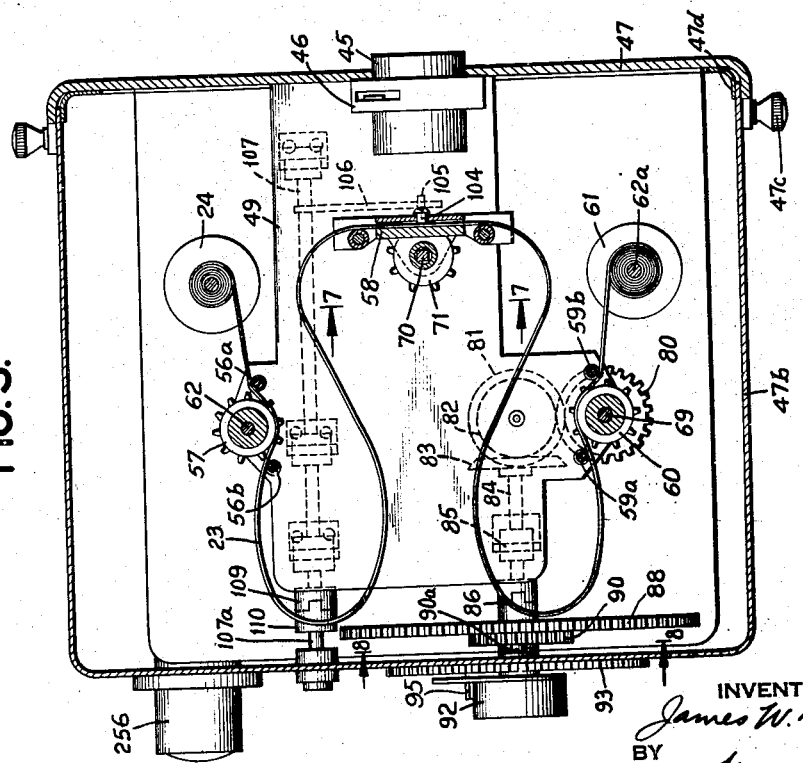
Fig. 5 is a detail sectional view taken on line 5—5 of Fig. 4 showing details of the film feeding mechanism.

The camera 41 (Fig. 2) comprises a front plate 47 secured as shown to brackets 47a which are affixed to the base 38. A removable cover 47b is secured as shown in Fig. 5 to the plate 47 by means of knurled screws 47c. The plate 47 carries a holding plate 47d (Fig. 5). It will be appreciated that with the parts 47, 47b, 47c, 47d in the relation shown in Fig. 5, the interior of the camera is thus made light tight. To permit insertion and removal of film, the cover 47b is provided with a hinged door 43 (see Fig. 3). This is securely fastened in closed position by means of thumb screws 44. The door when closed is light tight to prevent entrance of any light into the interior of the camera (see Fig. 4).

The camera comprises a lens 45 (Fig. 5) and shutter mechanism 46 fastened to the front plate 47 of the camera unit. Also fastened to front plate 47 is a left end plate 48 and a right end plate 49, as viewed in Fig. 4. Mounted on the plate 48 is a shutter trip solenoid 50 (see also Fig. 2). Upon energization of this solenoid, a movable bracket 51 is moved upwardly as viewed in Fig. 2 against the action of spring 52. The bracket 51 carries an extension 53 adapted to trip the lever 46a of shutter 46 when solenoid 50 is energized. The film 23 traverses the path indicated in Fig. 5 as follows: Film 23 extends from supply roll 24 over rods 56a, 56b and under sprocket 57 to form a large loop before entering the gate 58. Film 23 then extends from the gate 58 into another loop under rods 59a, 59b and over sprocket 60 to a take-up spool 61. Take-up spool 61 is mounted on shaft 62a and fastened thereto in the usual manner (see Fig. 3). The film feeding mechanism is driven as follows: The sprockets 57 (Fig. 5) are driven from a shaft 62 (see also Fig. 2) which extends through the plate 48 and which connects with a ratchet 63. This ratchet is rotated clockwise upon the return movement of pawl 64 under control of solenoid 65. Solenoid 65 when energized moves the bracket 66 to the left as viewed in Fig. 2 carrying the pawl 64 with it. Upon de-energization of 65 and upon return movement of 66, under the action of spring 67, the pawl 64 engages a tooth of ratchet 63 to move it clockwise one ratchet tooth position. Shaft 62 has fixed thereon a gear 68a which, through an idler 68b, drives gear 68c and through another idler 68d, drives gear 68e. Gear 68e is fastened to shaft 69 (see Fig. 5) which carries the film feeding sprockets 60. Gear 68c is fastened to shaft 70 which carries the film feeding sprockets 71. The shaft 70 (see Fig. 4) is journaled in side plates 48 and 49. Between the side plates the square is in cross-section to slidably receive the gate assembly 58. The square shaft passes through bearing bushings 72 (Figs. 6 and 7) which are rotatable in the gate structure and intermediate the bushings 72 there is a sleeve 73 which carries the sprockets 71. Sleeve 73 has a square hole through it so as to permit it to slide along the shaft and be driven by rotation of the shaft. Extensions 58a of the gate structure 58 restrict the movement of sprockets 71. It will be mentioned later how the gate 58 is shifted to the left or right on the shaft 70 as viewed in Fig. 6. With this square driving connection between shaft 70 and sprockets 71, the sprockets are free to move sideways upon the shaft but will be rotated upon rotation of the shaft under control of gear 68c. Fastened to gear 68e is a pulley 75 which, through belt 76 and pulley 77, drives the shaft 62a to which is affixed the take-up spool 61 (see Fig. 2).

Summarizing the action thus far, each energization and subsequent de-energization of magnet 65 effects a forward step of rotation of ratchet 63. Ratchet 63 by gearing 68a, 68b, 68c, etc. (Fig. 2), rotates sprockets 57, 71 and 60 to feed the film from the supply spool 24 to take-up spool 61 (Fig. 5). To the right of plate 49 as viewed in Fig. 4 and below 49 as viewed in Fig. 5 is a spur gear 80 fastened to shaft 69. Gear 80 drives another spur gear 81 which in turn is fastened to bevel gear 82. 82 drives another bevel gear 83 which is fast to the shaft 84. Shaft 84 is carried in a bearing 85 (Fig. 5) and drives the female member of a key and slot connection 86. The male member of 86 is secured to a gear 87 which is just in back of gear 83 as viewed in Fig. 4 (see also Fig. 8). 87 in turn drives a large spur gear 88 which through idlers 89 and 90 (see Figs. 4 and 8) drives a shaft 90a. Shaft 90a extends through the cover 91 to drive the knob and pointer 92. Knob and pointer 92 (see Fig. 1) cooperate with the index wheel 93 and each energization of line space magnet 65 will rotate the pointer one unit over the index wheel. Index wheel 93 is freely rotatable on shaft 90a and is held in position by a detent 94. The handle 95 is fixed to the index wheel to provide for the positioning of the same at the start of any recording operation. The knob and pointer 92 is also used when loading the camera to manually feed the film through the various mechanisms.

Character spacing mechanism

Provision is made for moving the film across the path of light from lens 45 to provide for character spacing upon each exposure. In a manner which will be later explained, each character to be recorded is depicted on the fluorescent screen 100 of the cathode ray tube 40. A suitable light tight tube 101 is interposed between the cathode ray tube 40 and the lens 45 as shown in Fig. 2. Referring now to Figs. 4 and 6, the gate structure 58 is provided with a slot 102. The lens structure 45 when the gate is in the position shown in Fig. 4 projects the image of a character on the screen 100 at the mid-point of this slot marked with a small center line in Fig. 6. Provision is made for moving the gate structure 58 horizontally as viewed in Fig. 4 so that the projected image may occupy any one of a plurality of positions on the portion of film under the slot 102. The gate 58 is slidably mounted on rods 103. A connecting shaft 104 is fastened to gate 58 and passes through the plate 49. The shaft 104 is provided with a pin 105 which cooperates with a forked member 106 (see Figs. 4 and 5). The forked member 106 is secured to another shaft 107 which is mounted in bearings 108 also secured to plate 49. The shaft 107 is provided with the usual key and slot connection 109, 110 and a further shaft 107a extends through the casing 47b to the outside. Referring now to Fig. 1, shaft 107a has secured thereto a slotted member 111. This member 111 cooperates with another member 111a. 111a is provided with pins 112 which are movable in a slot 113 of member 111. A spring 114 holds 111 and 111a in such a manner that the entire structure tends to elongate. 111a is pinned at 115 to an escapement rack 116. The rack 116 is provided with a slot 117 which cooperates with studs 118 in a supporting bracket 119. It will be noted that the rack 116 is marked 0, 5, 10, etc., up to 60 and these markings cooperate with a pointer 120. This is to provide means for indicating the portion of film that a character is being recorded on. An escapement structure generally designated 42 cooperates with the rack 116 and each actuation of the escapement in a manner to be described permits movement of the rack 116 to the right as viewed in Fig. 1. Restoration of the rack 116 is provided by means of a clutch generally designated 121 and a motor 122. The clutch structure is connected to the rack 116 by means of a flexible steel ribbon 123. Upon operation of the clutch and motor mechanism as will be described presently, the rack 116 is moved to the left as viewed in Fig. 1 to such a position that the 0 on the index cooperates with the pointer 120. Another ribbon 124 is connected to a take-up spring and pulley 125 which tends to move the rack 116 to the right and permits the escapement to function in the customary manner. A small stop 126 contacts the pointer 120 at the extreme left-hand position of travel of the rack. Another stop 127 cooperates with the carriage rack contacts 128 (see also Fig. 1a) at the time the 0 reaches the pointer 120. Engagement of the stop 127 with the insulated portion 129 of contacts 128 opens such contacts and as will be later explained declutches the carriage return mechanism.

To summarize the operation, the carriage return mechanism will swing the lever structure 111, 111a clockwise as viewed in Fig. 1. This in turn by the shafts 107a, 107 and fork 106 moves the gate structure to the right as viewed in Fig. 4. Accordingly, the first character depicted on the cathode ray screen 100 will fall on the left-hand portion of the film under slot 102. Each movement of the rack 116 to the right will accordingly provide a counterclockwise rotation of shaft 107a as viewed in Fig. 1 and a clockwise rotation of shaft 107 as viewed in Fig. 4. Accordingly, the gate structure will move to the left in Fig. 4 and each succeeding character will be at the right of the one preceding it.

*Operation of the escapement mechanism*

The escapement mechanism 42 (Fig. 1) is provided with an escapement pawl 130 and an escapement dog 131. The escapement pawl 130 is pivoted at 132 and the pawl 131 is freely mounted on a shaft 133 in the usual manner. That is, the pawl 13' has a hole surrounding the shaft 133 which is considerably larger than the shaft itself. A rocker arm 134 is likewise pivoted on the shaft 133 and fastened securely thereto. A pin 135 in rocker arm 134 cooperates with a slot 136 in the dog 131 and a further pin 137 cooperates with a slot in the left-hand extremity of pawl 130. Accordingly, upon a clockwise rotation of shaft 133, as viewed in Fig. 1, the pawl 130 is moved downwardly under control of pin 137 to engage one of the teeth in rack 116. The dog 131 is moved upwardly under control of pin 136. Under action of spring 138, the escapement of 131 is then permitted to move to the left. Accordingly, when the shaft 133 is returned to its original position, the dog 131 is in position to engage the next tooth of the rack 116 and the removal of pawl 130 permits the rack to move one position to the right.

In order to rock the shaft 133, an escapement maget 139 (see Fig. 2a) is provided. Secured to the shaft 133 is an armature structure 140 (see also Fig. 2). Energization of magnet 139 will move the structure 140 and rock the shaft 133. A spring 141 is provided for restoration of armature 140 upon de-energization of the magnet 139. Accordingly, each energization of magnet 139 provides for a single letter space of the film in the camera unit.

*Carriage return mechanism*

Figure 3:
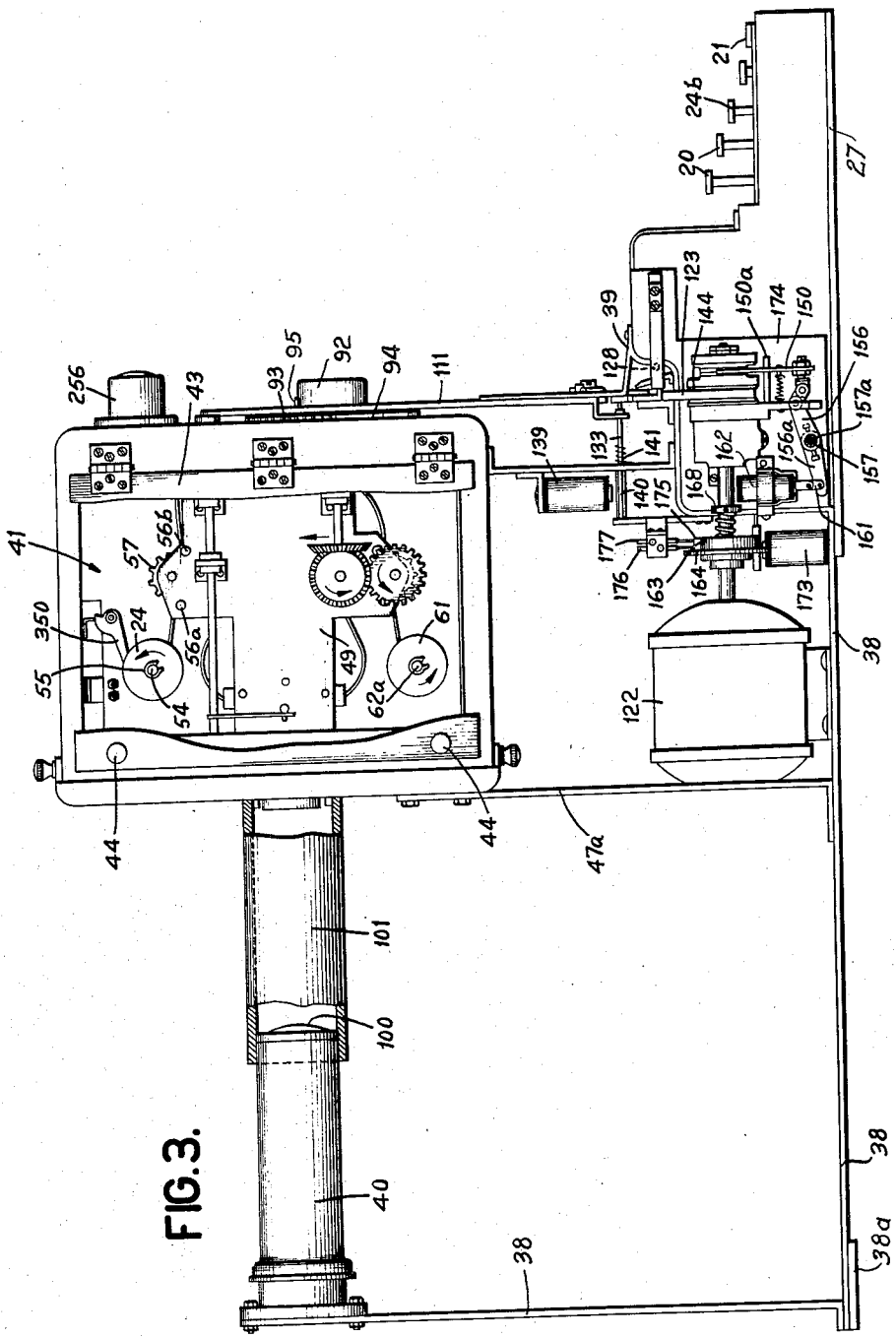
Fig. 3 is a left end elevational view of the combined keyboard and camera unit taken on line 3—3 of Fig. 1 and including the portion which is omitted in Fig. 1. In this view, certain door parts are shown broken away to show the construction within the camera unit.

The return movement of the escapement (Figs. 1 and 3) is effected by devices comprising a flexible band 123, a drum 144 upon which it is wound and a clutch 121 for rotating the drum. The drum 144 is shown in Fig. 3a and is mounted upon the motor shaft 143, but is normally free to turn thereon. To connect the drum 144 with the motor shaft when necessary a clutch plate 145 is mounted to slide upon the shaft 143 but is splined thereto so that it must turn with the shaft. This clutch plate when pressed to the left engages the flat web of the drum so that the clutch plate and the drum are held together frictionally, and the drum is thus forced to turn with the shaft.

The axial movement of the clutch plate is produced by the two relatively movable disks 146 and 147, which embrace and ride loosely upon the hub of the clutch plate. A thrust plate 148 is fixed to the outer end of the motor shaft by means of nuts 149, and ball thrust bearings are interposed between the disks 146 and 147, and the plates 145 and 148 respectively. A forked lever 150 has inwardly directed extremities 151 (see also Fig. 1) and is guided upon a stud 150a. In Fig. 3a, the clutch lever 150 is vertical, and there is no end thrust between the clutch members. If, however, the lever be rocked from its vertical position, its extremities 151 act to pry the disks 146 and 147 away from each other, and pressure is thus transmitted through one of the ball bearings to the clutch plate, while the reaction of this pressure is taken by the other ball bearings supported by the thrust plate 148.

The clutch lever is moved by means of a toggle comprising a lever 156 which is fastened on a sleeve 157a. Also fastened to the sleeve 157a is a further lever 156a (see also Fig. 3). The sleeve 157a is mounted on a stud 157 in the plate 174 which is secured to the plate 38 of the recording unit. A link 158 connects one end of the toggle lever 156 with an adjustable stud 159 in the lower end of the clutch lever. The toggle is normally held in the broken position of Figs. 3a and 3, being held in that position by a spring 160 attached to the clutch lever. The opposite end of the toggle lever is connected, however, to the link 161 of the solenoid 162. Consequently, when the solenoid 162 is energized under control of the carriage return key, the toggle lever is swung on its pivot so as to straighten the toggle. This positions the clutch lever into position to actuate the clutch as above described. With the drum 144 connected as described to the motor shaft 143 the flexible band 123 winds up on the drum and the escapement rack 116 (Fig. 1) is returned to a starting position.

Key release commutator structure

In Figs. 3 and 3a, a commutator 163 is secured to the friction plate 164. Cooperating with the plate 164 is a corresponding friction plate 165 which is fastened to the hub 166 and keyed to the shaft 143 as shown in Fig. 3a. The structure 163, 164 is spring pressed against the plate 165 by a compression spring 167 held in place by the collar 168 which is secured to shaft 143 (see Fig. 3). The disk 164 is restrained from rotary movement by the latch 170 (see Fig. 2) of the armature 171. The disk 164 is provided with a small extension to cooperate with 170.

The armature 171 is pivoted on the shaft 172 and upon energization of the commutator clutch magnet 173 the latch 170 is rocked out of engagement with the disk 164. Accordingly, the commutator 163 rotates, and near the end of its revolution, the conducting portion 175 thereon is spanned by the brushes 176, 177. Further details of the circuit controlled by the commutator will be explained with reference to the circuit diagram.

The method of loading the camera will now be described. The door 43 is opened and a roll of unexposed film 24 (see Figs. 3, 5 and 4) is placed on the stud 54 and secured thereto by spring clip 55. The film is then fed between rod 56a and sprocket 57. The sprocket drive is actuated manually by turning knob and pointer 92. The film is then guided between rod 56b and sprocket 57. A large loop is formed as shown and the film is then inserted into the gate 58 and accordingly passes over sprocket 71. The film is then formed into another loop and passed under rods 59a, 59b and over sprocket 60. The film is secured to the take-up spool 61 on shaft 62a in the usual manner. The door 43 is then closed and secured by thumb screws 44.

Associated with the supply roll 24 (Fig. 2) is a lever 350 which maintains contacts 350a closed until the end of a film roll is reached. Contacts 350a when open prevent continuation of machine operations and extinguish a visible signal light.

At this point in the description and before describing the mechanical details of the pattern component emitters, it may be helpful to briefly explain some of the characteristics of a cathode ray tube. A typical and suitable cathode ray tube is illustrated diagrammatically on the circuit diagram (Fig. 19c). Such a tube comprises an evacuated body into which extends a heater element 200. Associated with the heater element is a cathode 201 providing a source of electrons. Also within the evacuated body and disposed in order from left to right are a grid 202, an anode number "1" designated 203, an anode number "2" designated 204 and two pairs of deflector plates. The upper and lower vertical deflecting plates are respectively designated YU and YL and the horizontal deflecting plates are designated XL and XR, signifying left and right horizontal deflection. The right-hand end of the cathode ray tube also comprises a fluorescent screened end 100. The "Y" deflector plates are placed above and below the center axis of the tube. The "X" deflector plates are disposed to the right and left of the center axis of the tube.

In the operation of the cathode ray tube with no potential applied to either set of plates, the stream of electrons will be emitted along the central axis of the tube and impinge on the fluorescent screen 100 at the center of the screen. This will illuminate a spot at the center of the tube. If, however, the potential on the horizontal and vertical deflecting plates is changed, the stream of electrons can be deflected either upwardly or downwardly or to the right or to the left or in combined resultant directions. Changing relative positive potential on the Y set of plates will bring the stream of electrons up or down and similarly changing the relative potential on the X plates will divert the stream of electrons alternatively to the right or left. By providing proper potential and proper changing potential over a period of time on both sets of plates any desired figure or character can be traced on the fluorescent screen 100. By repeatedly tracing a beam of electrons to the proper points of areas of the screen, an image may be produced which can be either visibly read or photographed. Cathode ray tubes are adapted to operate and deflect electron beams at extremely high frequency. They may be termed an "inertia free image tracing device."

Having generally described the characteristics of a cathode ray tube, there will now be described one manner of providing the deflecting voltages which control the movement of the tracing electron beam of the various tubes.

Referring to Fig. 12, reference character 210 designates a box or housing which affords a housing for the pattern component emitter assembly. This assembly comprises a driving motor 211 which by any suitable drive such as by the belt and pulley arrangement shown, is adapted to constantly rotate shafts such as 212. Fixed at intervals along these shafts 212 are a series of pattern disks, one of which is designated 213 in Fig. 13. For the machine herein shown sixty-six of such disks 213 are provided. Each disk 213 is generally opaque, but is provided with two transparent tracks, one of which is designated 213X and the other of which is designated 213Y (Fig. 14). For each disk 213 there is provided two sources of light. Each source of light preferably comprises a lamp 214 within a lamp box 215 together with a suitable set of lenses 216 and an apertured diaphragm 217 which is provided to direct and concentrate the light on and through the transparent tracks of the disk 213. As shown in Fig. 12, it will be noted that there are two light sources, etc., for each disk. One light source directs light to and through the 213X track and the other light source directs light through the 213Y track. On the opposite side of each disk are two photo-cells which are respectively designated 218X and 218Y.

Also driven by the shafts 212 are a number of commutator disks generally designated 314 in Figs. 12 and 15. One such commutator is provided for each pattern component emitter disk. Bearing on each commutator disk 314 are a pair of brushes 314a and when a conducting portion on the commutator comes under this pair of brushes a circuit is established from brush to brush as shown in Fig. 15a. The purpose of these commutators will be described subsequently.

If the width of one of the tracks 213X is varied at different angular positions around disk 213, different amounts of illumination may be allowed to pass to the photo-cell 213X upon rotation of the disk. This will vary the output of the circuit controlled by the particular photo-cell. The photo-cells act to allow more or less current to flow in their related circuits depending upon the amount of light which they receive.

Figure 16:
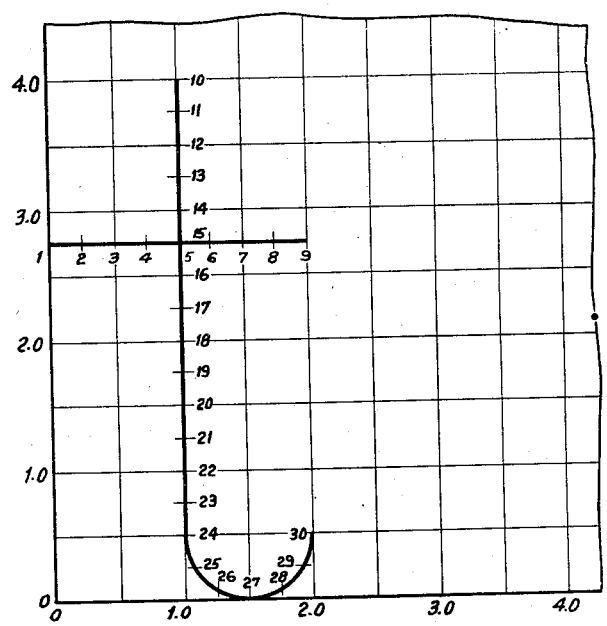
Fig. 16 is a detail view showing a graphical layout of the character "t"
Figure 17:
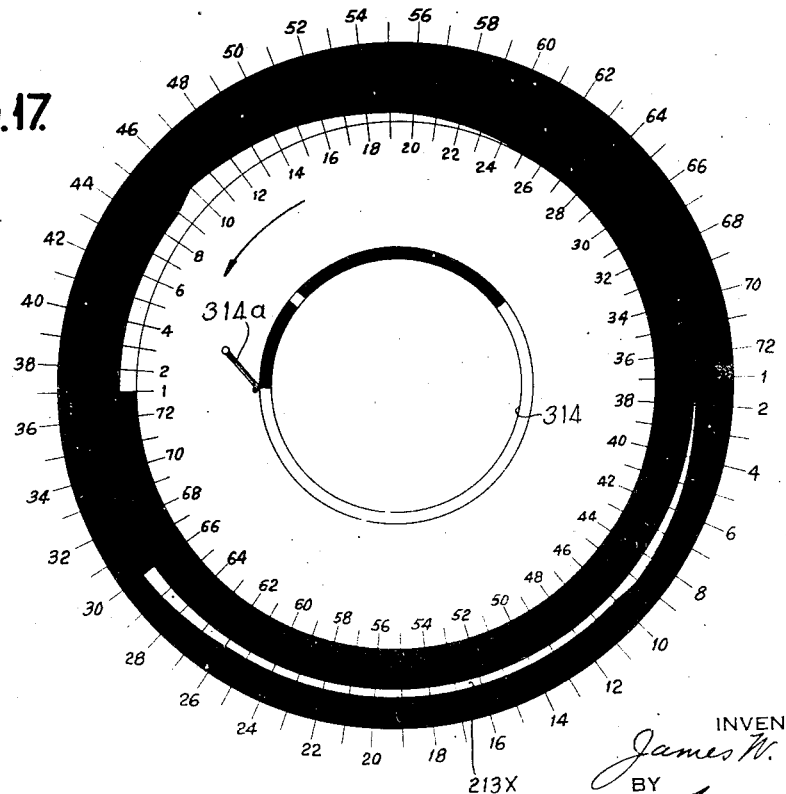
Fig. 17 is a detail layout of the pattern component emitter and commutator for the character "t"

Referring to Figs. 16 and 17, on Fig. 16 the outlines of the character "t" have been laid out. As shown, the character "t" has been divided up into a set of sections of equal length, this particular character being numbered from 1 to 30 inclusive. Referring to Fig. 16, it will be noted that in order to trace the electron beam for the horizontal part of the character, the Y component voltage should be maintained constant while points 1 to 9 are traced. If the disk of Fig. 17 be examined and the 213Y track be traced from 1 to 9, it will be noted that the transparent track has a constant width for all points from 1 to 9. Thereafter the tracing beam should be caused to ascend and move to the left to register point 10. To cause ascending of the beam, there is an abrupt increase in the width of the Y track from point 9 to point 10. Referring now to the 213X track, the X component at point 1 is 0 but from this point to point 9, the X track gradually increases in width as indicated on the disk. From point 9 to point 10 the X track abruptly diminishes in width to put the beam back to the central part of the character.

To determine the width of say the Y slot at any point such as 8, the Y ordinate distance between the 0 line of Fig. 16 to the point 8 is measured. This distance is then multiplied by a constant and the resulting amount will give the width of the Y slot at the 8 point of the disk. The constant which is used is the ratio of the maximum width of the Y slot at say the point 10 with reference to the maximum distance between the X axis and the point 10, which is the maximum Y ordinate. The maximum width of a slot in an arbitrary value dependent upon the circuit relations and characteristics of the photo-cell tubes which are used.

Figs. 18a through 18h inclusive, show the configurations of the tracks for the disks which are utilized for the related character and digit characteristics. The various disks of Figs. 18a, 18b, etc., constitute pattern component emitters and if these disks are maintained in a state of rotation, it will be appreciated that they will progressively vary the X component voltages and the Y component voltages which are applied to the deflection plates of the cathode ray tubes. It will be understood that two photo-cells are provided for each digit whose image is to be traced.

The foregoing description has described in detail the manner of laying out the disks for a particular character, i. e. "t." All characters or digits may be laid out in a similar manner, the configuration of the tracks on each disk depending solely on the configuration of the particular character or digit to be reproduced. A few examples of disks for different characters are shown in Figs. 18a to 18h inclusive, which show disks for B, b E, e and the numerals 1, 4 and 5.

Suitable amplifier circuits, preferably including electron discharge devices, may be employed under control of the photo-cells 218X, 218Y, etc., to produce variations in potential across the deflection plates of the cathode ray tube 40 in accordance with variations of light impressed on the photo-cells as will be understood by those familiar with the art.

A simple and convenient amplifier circuit for this purpose is illustrated in the drawing (Fig. 19a).

The photo-cell 218X, which is utilized to control the horizontal deflection of the cathode ray beam in the cathode ray tube 40, for setting up the character "1" may be used in describing a typical amplifier circuit. The photo-cell 218X is connected in series with a battery 220 and a resistor 221, and with varying illumination of the photo-cell the difference of potential across the resistor will vary in accordance with the varying illumination of the photo-cell. The grid cathode circuit of a vacuum tube 222 conveniently biased negative at all times by the battery 223, includes a portion of the resistor 221, preliminarily adjustable by a contact 224 on the resistor. The plate cathode circuit of the tube 222 includes a B battery or other source of direct current 225 and a resistor 226 in series therewith intermediate the positive side of the battery 225 and the plate of the tube 222. For impressing a proper voltage across the horizontal deflecting plates XL and XR of the cathode ray tube 40, which are connected to the terminals 227 and 228 of the amplifier unit, a biasing network is conveniently provided, including a resistor 229 connected across a source of voltage preferably comprising the series connected batteries 230 and 231. The conductor intermediate the batteries 230 and 231 is also connected to a preliminarily adjustable contact 232 on the resistor 226 and the terminals 227 and 228 are respectively connected to a preliminarily adjustable contact 233 on the resistor 229 and to the positive side of the battery 225 (i. e. the positive end of the resistor 226).

It will now be seen that if the photo-cell 218X receives no illumination or a predetermined minimum illumination, the grid of the tube 222 will have a predetermined maximum negative bias. The contact arms 224, 232 and 233 are conveniently so adjusted (in a manner which will be readily understood by those familiar with the art) that for this 0 or predetermined minimum illumination of the cell 218X the resulting maximum negative bias on the grid of the tube 222 will be such that the output voltage between the terminals 227 and 228 will maintain the electron beam at one side of its horizontal path of travel, viz. the left-hand side in the apparatus illustrated. That is, although the contact arm 232 is negative with respect to the positive side of the battery 225, the biasing network including the resistor 229 imposes sufficient opposing voltage in the circuit of the deflector plates XL, XR, as to make the terminal 227 just sufficiently positive with respect to the terminal 228 to maintain the electron beam in its extreme left-hand position. Now, as the illumination of the cell 218X increases, the negative bias on the grid of the tube 222 decreases, resulting in an increase of plate current and a corresponding increase of the potential drop between the positive side of the battery 225 and the contact 232. As a result, the potential of terminal 227 becomes less positive with respect to the terminal 228; the adjustments of the contacts on the resistors being conveniently such that the potential between the terminals 227 and 228 becomes zero for an illumination of the photo-cell 218X which is intended to represent a positioning of the cathode beam at the middle of its horizontal path. Increase of the illumination beyond this point results in making the terminal 228 positive with respect to the terminal 227, until at the point of maximum illumination, the cathode beam is deflected to its extreme right-hand position.

It will be understood that the amplifier and balancing circuits controlled by the photo-cell 218Y are conveniently identical with those herein above described for the cell 218X so that the vertical displacement of the cathode beam between plates YL and YU is obtained by a correspondingly similar variation of output potential between the terminals 235, 236, to which these plates are connected.

Since it will now be understood that the actual position of the cathode ray beam at any instant depends upon the controlling potentials applied to both sets of deflecting plates XL, XR and YL, YU, the position of the beam is directly controlled (through the instrumentality of the amplifier circuits described) by the amount of illumination respectively received by the photo-cells 218X, 218Y. Thus, as the illumination respectively received by these photo-cells varies during rotation of the pattern component emitter, the cathode ray beam traces a path to portray the particular character (in this case the character "1" represented by the particular pattern component emitter which controls the illumination of the photo-cells, that is, the tracks 213X and 213Y respectively, provide a predetermined variation in the illumination of the photo-cells 218X and 218Y for each cycle of rotation of the emitter and the resultant of the corresponding variations in deflecting potential on the plates of the cathode ray tubes, causes the cathode ray beam to trace a path,—in this case a path depicting the character "1," which is predetermined by the pattern component emitter.

The foregoing description has explained in detail one section of the amplifier unit with its connections to the photo-cells and the output terminals of the amplifier for the digit 1. It will be understood that the amplifier is arranged with a plurality of sections of identical construction and wiring. There are such additional sections for digits 0 and 2 through 9 inclusive, a through z inclusive, both upper and lower case characters, and certain punctuation marks. In the circuit (Fig. 19a) only a few of these amplifier units have been shown. It is obvious to anyone skilled in the art how this circuit may be extended to include amplifiers for further characters as above mentioned. The sections are indicated by correspondingly numbered boxes in Fig. 19a of the circuit diagram.

The circuits for supplying current to the lamps 214 for illuminating the photo-cells are not shown in the circuit diagram for the complete machine. These illuminating lamps can be conveniently wired in any suitable circuit to any source of current for the machine or an independent source.

It will be appreciated that suitable current supply and proper circuits to the heater elements of the amplifier tubes 222 should be provided. These features are well known in the art and, for clarity in the circuit diagram, such features are omitted.

The foregoing description has explained generally the manner of applying the deflecting voltages to the cathode ray tubes. Before describing in details the circuit diagram of the machine and the operation in detail, it may be generally explained that for a recording operation provision is made for selectively connecting the proper amplifier terminals corresponding to the character it is desired to record to the cathode ray tube. This is done under control of the keyboard.

There is one further control which may be mentioned at this point and that is a control to provide suppression of the cathode ray tube beam between the beginning and end of a character, or certain parts of a character when necessary. Referring to Figs. 16 and 17, it will be noted that when the character "t" is traced the beam must jump from point 9 to point 10 without any tracing and from point 30 back to point 1. The circumference of the disk in Fig. 17 has been divided into a number of equal portions. The length of any character will determine the amount of disk circumference which is utilized for tracing that character. In the case of the character "t," only 30 spaces of the disk circumference are utilized. In the center of the disk (Fig. 17) is a layout of one of the commutator structures such as shown in Figs. 12 and 15. The darkened portion of this commutator represents insulation and accordingly the light portion represents the conducting section. The commutator provides for suppression of the cathode ray tube beam when its brushes 314a make on a conducting portion. It will be noted that the circuit is broken between points 1 to 9 and is made momentarily from point 9 to point 10. This suppresses the beam in the manner desired between points 9 and 10 of the character. The circuit is then again broken between points 10 and 30 to permit the cathode ray beam to trace points 10 to 30 as shown in Fig. 16a. The circuit is then made from point 30 back to point 1 and during this portion of the rotation the beam is suppressed upon the cathode ray tube screen. Each disk in Figs. 18a to 18h is shown with its associated commutator structure and each commutator functions in the manner desired to control the beam for its respective character.

The set of pattern component emitters heretofore described afford a simple means for generating electrical effects—i. e., more specifically changes in potential over a determined time period—for providing suitable controls for an electronic device such as a cathode ray tube whereby such tube may display on its screen the outline of a character or characters. In the disclosed preferred embodiment, an individual pattern component emitter is provided for each different character and constitutes a generating device for controlling the tracing of the character outline by the cathode ray tube. However, the present invention is not limited to such specific arrangement but may be deemed to embrace and cover any equivalent generating device for providing component representing electrical characteristics for a set of different characters which is adapted to control a cathode ray tube so that the latter may display any one of the different characters of a set of different characters. Various changes and modications in this arrangement may be made as will be apparent to those skilled in the art. In accordance with the present invention the generating means constitutes a set of character configuration determining devices to provide electrical components representative of the outlines of a set of characters and such devices are adapted for controlling a cathode ray tube so that the latter may display any one of a set of characters. The particular character which is displayed is selected from the available generated set by the operation of a selected key of a keyboard. Preferably the keyboard—or more exactly the selective connecting devices controlled thereby—are disposed intermediate the generating device for the set of different character outlines and the cathode ray tube whereby the latter may depict the particular character outline desired which is selected by the selective operation of a particular key of the keyboard.

*Circuit diagram*

It is understood that the pattern component emitter unit, the keyboard unit and the recording unit are each mechanically independent and to provide for interaction between these units it is merely necessary to connect them electrically. In order to provide for connecting the keyboard unit to the recorder unit and the pattern component emitter unit to the keyboard unit, suitable plugboards may be provided with sockets 255a (Fig. 19b) connected to the keyboard unit and 255b connected to the recorder unit. These sockets 255a and 255b may be connected by plug connections 256. Further sockets 257a (Fig. 19a) may be connected to the keyboard unit for connection through plug connections 258 with sockets 257b connected to the pattern component emitter unit. In lieu of single plug connections multi-pronged plugs may be used.

It will be assumed that the three units of the machine are connected as shown in Figs. 19a, 19b and 19c. The pattern component emitter unit and the commutator unit is shown on Fig. 19a. The keyboard unit is shown on Fig. 19b and the recording unit on Fig. 19c.

Further, it is understood that the machine has been loaded with a supply of unexposed film in the manner previously described and accordingly that the camera unit is ready for recording operations.

To put the machine in operation the line switch 251 (Fig. 19c) is closed to provide current supply to the motor 122. The switch 252 (Fig. 19b) is closed providing current supply to lines 253 and 254 from the battery 255. In series with the positive terminal of 255 is an indicating lamp 256 which lights to indicate that the machine is ready for operation (see also Figs. 1, 2 and 3). Also in series with battery 255 is the film lever 350a (Fig. 19c) which when open de-energizes lamp 256 and breaks the circuit to lines 253 and 254. Assume that the escapment rack 116 is in the position shown in Fig. 1. Accordingly, it is first desired to return the rack to its extreme left-hand position.

The carriage return key 20CR (see Figs. 19b and 9) is depressed. Current supply is then provided from line 253, through contacts 17CR, through one of the plug and socket connections 255, 256 to the carriage return control relay 259 (Fig. 19c) and back to the other side of line 254. Energization of relay 259 closes its contacts 259a. These contacts provide a circuit for maintaining relay 259 energized in the following manner. The circuit is from line 254, through relay 259, contacts 259a, carriage return magnet 162, carriage rack contacts 128, plug and socket connection 255, 256 (Fig. 19b) and back to the other side of line 253. This circuit also provides for energizing the carriage return magnet 162 and accordingly the lever 156, 156a is rocked clockwise as viewed in Fig. 3 to move the plate 150 to the right and clutch pulley 144 with the motor shaft 143. This will wind up the ribbon 123 in the manner previously described and cause the rack 116 to move to the left (see Fig. 1). Just before the stop 126 engages the pointer 120, the stop 127 will open the carriage rack contacts 128 (see Fig. 1a). Opening of these contacts de-energizes the holding circuit for relay 259 and carriage return magnet 162. The machine is now in a condition for character recording.

The index wheel 93 (Fig. 1) is set in the manner previously described so that the 0 position on the index cooperates with the knob and pointer 192. Depression of any key as, for example, the "b" key provides for a character recording in the following manner: Upon depression of a "b" key, the corresponding contacts 17, 18 and 19 (see Figs. 10 and 19b) are closed. The notch 25a is engaged by the locking bar 26 and the key is held down in the manner previously described. Circuits are now completed from terminals 227 and 235 of the "b" amplifier via the 318X and 318Y lines through connectors 257, 258 (Fig. 19a) to the contacts 19 and 17 (Fig. 19b), thence via line 265 from contacts 19, to line 266 which extends via the plug connection 256 to the XL plate of the cathode ray tube 40 (Fig. 19c). The circuit from contacts 17 (Fig. 19b) extends via wire 267 to wire 268 via the plug connection 256 to the YL plate of the cathode ray tube 40 (Fig. 19c). The XR and YU plates are commonly connected to ground as shown in Fig. 19c. Likewise the connections from 228 and 236 (Fig. 19a) are commonly connected to line 236a which eventually extends to ground (Fig. 19c).

These last mentioned circuits provide the X and Y component deflecting voltages for the cathode ray tube and cause the electron beam to trace out the letter "b" on the fluorescent screen 100. The 18 contact of the "b" group provides a circuit as follows: From the negative terminal of intensity control battery 275 (Fig. 19b), via wire 276, through the plug connection 258, to the common line 277 (Fig. 19a). This common line extends to the commutator 314 associated with the "b" amplifier unit. The layout of the commutator is shown in Fig. 18b and circuits are completed therethrough in the proper manner to suppress or permit the electron beam to strike the fluorescent screen 100. The circuit extends from the other side of the commutator, via wire 278, through the plug connection 258, to a wire which extends to the 18 contact (Fig. 19b). The other side of contact 18 is connected to wire 279 which connects, through wire 280, plug connection 256 to the intensity control grid 202 (Fig. 19c). At the time the key is depressed the common bail 33 (Fig. 10) is actuated in the manner previously described causing bail contacts 36b to close and contacts 36c to open (Fig. 19b). On the circuit diagram, bail contacts 36c on opening remove the normal high bias between the negative side of battery 275 and line 280, the positive side of battery 275 being connected back to the cathode element of the tube. Battery 275 (Fig. 19b) is shunted by a high resistance 275a from which a variable arm 275b is connected to line 280. This arm provides the normal bias when the electron beam is on the screen 100 (Fig. 19c). Bail contact 36b on closing provides a circuit from line 253 (Fig. 19b), through plug connection 256, shutter magnet 50 (Fig. 19c), through the commutator clutch magnet 173, through the escapement magnet 139 and back to line 254. It may be mentioned that the timing relation between bail contacts 36b and contacts 17, 18, 19 is adjusted so that bail contacts 36b close slightly after contacts 17, 18 and 19 close. Also bail contacts 36c should open slightly before bail contacts 36b close. Energization of shutter magnet 50 (see also Fig. 2) will trip the shutter of the camera unit in the previously described manner. Energization of commutator clutch magnet 173 (see also Fig. 3) permits rotation of commutator 163. Energization of escapement magnet 139 prepares the escapement mechanism to permit movement of rack 116 one position to the right when magnet 139 is de-energized.

Summarizing the events thus far, upon depression of the character key, the deflecting voltages representative of the character "b" have been applied to the deflecting plates of the cathode ray tube. A proper bias control for the grid 202 has also been applied.

Tripping of the shutter accordingly causes the character "b" to be photographed on the film. It is now necessary to cause release of the key which is maintained depressed under control of the locking bar 26. Near the completion of its cycle of rotation, commutator 163 has its conducting portion 175 bridged by the brushes 176, 177 (Figs. 3 and 19c). A circuit is accordingly completed from line 253 (Fig. 19b), through the plug connection 256, through brush 176 (Fig. 19c), conducting strip 175, brush 177 to key release solenoid 31 and back to line 254. This will bring about a counterclockwise rotation of locking bar 26 (Fig. 10) and permit the key to return under action of its spring 32. If the operator should hold her finger on the key for a longer duration of time, the shutter magnet 50, the commutator clutch magnet 173 and the escapement magnet 139 would accordingly remain energized and upon release of the key, the events just described will occur. De-energization of escapement magnet 139 will escape the rack one position to the right as previously described and effect a movement of the film in the camera unit to a proportional amount. Further characters are photographed on the film in a similar manner. If it is desired to cause a spacing either between words or other characters, the space bar 21 (Fig. 9), of the keyboard unit is depressed. This causes a depression of key lever 13 associated with the space bar and a closure of contacts 17SP which are the only set of contacts controlled by the space bar. A circuit is accordingly completed from line 253 (Fig. 19b) through contacts 17SP, through the plug connection 256 to the escapement magnet 139 (Fig. 19c) and back to line 254.

This will effect an energization of the escapement magnet and move the rack 116 a space to the right. The operator by watching the relation of pointer 120 on the index of rack 116 can tell when a line of recording is complete. It is then necessary to cause a line spacing operation. To effect this, the line space key 20LS is depressed closing its corresponding contacts 17LS and completing a circuit from line 253 to the line space magnet 65 (Fig. 19c) and back to the other side of line 254. Energization of line space magnet 65 (see also Fig. 2) causes a one tooth rotation of ratchet 63 and a corresponding line movement of the film. By the gearing previously described, the pointer 92 (Fig. 1) will also rotate one position with respect to the index 93 to indicate the line that is being recorded. Further operations continue until the document or letter is finished. The operator may then depress the line space key several times to provide for spacing between the documents or letters that are being recorded. The index and pointer would then be reset to a 0 relationship and operations repeated. It may be mentioned that at the end of each line the operator will depress the carriage return key to provide for return of the film before recording the next line.

To record capital letters, a cap key 20CA is provided. Referring to Figs. 9 and 10, depression of the cap key 20CA will depress its corresponding lever 13 and bring the hooked portion 24a under the projection 24d. Key 20CA has one set of contacts 17CA connected therewith. These contacts will remain closed until the cap release key 24b (see Fig. 10) is depressed. Depression of this key will rock the lever 13 downwardly for a sufficient distance so that the spring 24c will return the key 24 to the position shown. Accordingly, upon release of key 24b, the key lever 13 associated therewith will be restored to a normal position. When it is desired to print capitals, the depression of the key 20CA will complete a circuit from line 253, through relay 290, contacts 17CA (Fig. 19b), plug connection 256 and back to the other side of line 254. Energization of capital control relay 290 closes its corresponding contacts 290a and opens contacts 290b (Fig. 19b). Accordingly, as shown on the circuit diagram, upon depression of the "b" key, the circuit instead of extending from the lower case "b" amplifier will extend from the upper case "B" amplifier and commutator (Fig. 19a), thence to the 17, 18 and 19 contacts (Fig. 19b) associated with the "b" key, whereupon a cap "B" instead of a lower case "b" will be recorded.

In the previous description, upper and lower case characters were provided for by having a pattern component emitter unit and amplifier for a lower case character and a different pattern component emitter unit and amplifier for an upper case character. In lieu of such an arrangement it is possible to change the size characteristics of a single character derived from a single pattern component emitter unit by proper charge of the potential taken from the amplifier unit. If the potential is increased, the character will be portrayed on the cathode ray tube on a larger scale. This modified arrangement for providing upper case character recording will now be described in connection with Figs. 20a, 20b and 19c arranged as shown in Fig. 20d. If Fig. 20a be compared with Fig. 19a, it will be noted that the amplifier circuit is generally the same except that the plate cathode resistor 226 is provided with a supplemental tap 232a which extends to a junction between supplemental batteries 230a and 231a. Such batteries are shunted by a supplemental resistor 229a and the variable tap 233a of this resistor extends to a supplemental terminal 227a. By taking the potential from 227a instead of from the normal terminal 227 there will be a higher available potential which eventually terminates at the deflecting plates of the cathode ray tube. The taking of the potential selectively from the lower case regular terminals 227 or from the supplemental terminals such as 227a is effected under the control of the capital control relay 290. This relay is energized in the manner previously explained and when it is energized, the biasing potential for the cathode ray tubes is taken from the supplemental terminals such as 227a instead of from the regular terminals 227, etc., which are used for lower case recording.

It may be mentioned that since a single amplifier unit is providing the potentials for a letter in upper or lower case and since such letter is of similar form, a common suppression commutator 314 is utilized for both upper and lower case control for a single character. Accordingly, contacts 290a and 290b can be dispensed with and each commutator can be connected to the cathode ray tube through the contacts 18.

Referring now to Figs. 21, 22 and 23, the general operation of the apparatus has so far been described in connection with the general relation of the sections of the machine as shown in Fig. 21, that is to say, there was a pattern component emitter unit which was wired to a keyboard which in turn was wired to a camera recording unit. In certain cases in practice, particularly in large establishments, it may be desirable to utilize a common pattern component emitter and amplifier unit for control of a plurality of camera recording units operating through individual keyboard units, one of which is provided for each camera unit. This relation of sections is shown in Fig. 22. As shown it merely involves cabling a plurality of keyboard units in multiple to a common pattern component emitter unit with its associated amplifiers. This system lends to cheapness in construction, since a common pattern component emitter unit and amplifier section may be used for a plurality of other units.

In practice, it also may be desired to produce duplicate film copies of common subject matter. This result may readily be achieved according to the present invention by providing a plurality of camera recording units as shown in Fig. 23 and connecting such units in multiple to a single keyboard unit. The keyboard unit in turn is controlled by a pattern component emitter unit. The pattern component emitter and amplifier unit in addition to having one set of plug sockets 257a can be provided with one or more sets of supplemental plug sockets such as 257aa. For simplicity in the diagram only one set of such supplemental sockets 257aa have been shown, but it is obvious that the sets of supplemental sockets can be extended to any desired number depending upon the size of the system and the number of units to be used. For connecting the keyboard in multiple to the camera units supplemental sockets 255aa have been provided (see Fig. 19b). Here again, while only one set of supplemental sockets 255aa have been shown their number can be increased as desired.

What is claimed is:

1. A device of the class described, in combination with a character selecting keyboard, a set of character configuration determining devices for generating electrical components representative of the outlines of the different characters, an electronic character displaying unit controlled by the aforesaid device which is selected for operation by the operated key of the keyboard, said device displaying successive characters as called for by successive actuation of the keys, said electronic device comprising a cathode ray tube having a screen upon which complete character outlines are traced and displayed and a camera recording unit for successively photographing on a photographic film the successively displayed characters.

2. A recording apparatus comprising in combination a set of devices for generating electrical components representative of the outlines of a set of characters, an electronic character displaying device comprising a cathode ray tube having a screen upon which complete character outlines are traced and displayed, a keyboard intermediate the set of devices and said electronic device with means controlled thereby for selecting which character outline is to be displayed upon the screen of the cathode ray tube and means for photographing the displayed character.

3. The recording apparatus according to claim 1 wherein the means for photographing the displayed character includes means for feeding a film character space by character space under control of the keys of the keyboard.

4. A recording system comprising a plurality of camera recording units, each unit including a cathode ray tube having a screen upon which a complete character outline is traced to be photographed, a plurality of keyboards, one for each recording unit and a set of electrical character configuration determining devices for generating electrical components representative of the outlines of a set of different characters and for controlling character outlines tracing on the cathode ray tube screen, said devices being common to the plurality of keyboards and to the plurality of recording units.

5. A recording system including in combination, a plurality of camera recording units, each unit including a cathode ray tube having a screen upon which a complete character outline is traced to be photographed, a character selecting keyboard common to all the camera recording units and a set of electrical character configuration determining devices for generating electrical components representative of the outlines of a set of different characters for controlling the cathode ray tubes of all of the camera units through the common keyboard.

6. A recording apparatus for recording a character in upper and lower cases, comprising generating means for generating electrical components representative of a character outline in lower case, generating means for generating electrical components of the character outline in upper case, an electronic character displaying device means for selectively connecting either generating device to said displaying device and a recording device for recording the displayed character.

7. A recording apparatus for recording a character in upper and lower cases, comprising generating means for generating electrical components representative of a character outline, an electronic displaying device for displaying a character, means to change the generated representations by a determined ratio to cause the displayed character to be of a different size, but of similar outline and a recording device for recording the displayed character.

8. A device of the class described, comprising a single cathode ray tube for displaying characters for photographic recording, a photographic device with means for feeding a film step by step, means for exposing the film at each step to the character displayed on the cathode ray tube, means to generate deflecting voltages for controlling the character displayed by the cathode ray tube, said means providing for the generation of deflecting voltages for displaying a set of different characters and a keyboard for connecting the cathode ray tube to the generator for the related character and character by character according to the keys depressed.

9. A character recording apparatus comprising in combination; generating means for controlling electrical effects to enable a cathode ray tube to display any one of a set of different character outlines, a cathode ray electronic tube for displaying and depicting any one of the different character outlines, keyboard controlled selecting and connecting means for variably connecting the generating means to the cathode ray tube so that the latter under control of the generating means will display the character related to the operated key of the keyboard, photographic means also brought into operation upon operation of a key of the keyboard for photographically recording upon a film the character outline which is generated and selected by the foregoing means, and means brought into operation upon the operation of a key of the keyboard for bringing about a photographing operation by said last named means.

10. A character recording apparatus including in combination; a cathode ray tube having the usual screen and two sets of deflection plates, source means to generate a plurality of sets of varying potentials, a keyboard having character keys controlling means to connect the source means affording proper set of said potentials to the deflection plates when one of said character keys is depressed, thereby causing said screen to depict the corresponding character, a camera recording unit carrying a film with the cathode ray tube screen focused thereon, auxiliary means controlled by any character key to cause said camera recording means to photograph the depicted character after the proper potentials are applied to the deflecting plates, further means controlled by any character key to cause one space of lateral movement of the film in the recording unit when said key is released.

JAMES W. BRYCE.